US012090965B2

(12) United States Patent
Yang (10) Patent No.: US 12,090,965 B2
(45) Date of Patent: Sep. 17, 2024

(54) COLLAPSIBLE SIDE PANEL STRUCTURE OF A ROOF PANEL

(71) Applicant: FORMOSA SAINT JOSE CORPORATION, Taipei (TW)

(72) Inventor: Ming-Shun Yang, Taipei (TW)

(73) Assignee: FORMOSA SAINT JOSE CORPORATION, Taipei (TW)

( * ) Notice: Subject to any disclaimer, the term of this patent is extended or adjusted under 35 U.S.C. 154(b) by 0 days.

(21) Appl. No.: 17/785,923

(22) PCT Filed: May 13, 2021

(86) PCT No.: PCT/CN2021/093576
§ 371 (c)(1),
(2) Date: Jun. 16, 2022

(87) PCT Pub. No.: WO2022/105152
PCT Pub. Date: May 27, 2022

(65) Prior Publication Data
US 2023/0331166 A1    Oct. 19, 2023

(30) Foreign Application Priority Data
Nov. 20, 2020   (CN) .......................... 202011309659.7

(51) Int. Cl.
B60R 9/045 (2006.01)
(52) U.S. Cl.
CPC .................................... B60R 9/045 (2013.01)
(58) Field of Classification Search
CPC ...................................................... B60R 9/045

USPC .......................................................... 224/321
See application file for complete search history.

(56) References Cited

U.S. PATENT DOCUMENTS

| 5,657,914 | A | * | 8/1997 | Stapleton | B60R 9/045 224/330 |
| 8,028,875 | B2 | * | 10/2011 | Kmita | B60R 9/045 224/325 |
| 9,346,409 | B2 | * | 5/2016 | Pfaeffli | B60R 9/045 |
| 11,603,047 | B2 | * | 3/2023 | Yang | B60R 9/048 |
| 2008/0290123 | A1 | * | 11/2008 | Sprague | B60R 9/045 224/321 |
| 2011/0079621 | A1 | * | 4/2011 | Byers | B60R 9/08 224/321 |

(Continued)

FOREIGN PATENT DOCUMENTS

| FR | 308725 A | * | 7/1955 | |
| FR | 2373421 A | * | 8/1978 | ............. B60R 9/045 |
| JP | 60076442 A | * | 4/1985 | |

*Primary Examiner* — Justin M Larson
(74) *Attorney, Agent, or Firm* — Ying-Ting Chen (57) ABSTRACT

The present invention discloses a collapsible side panel structure of a roof panel, set upon the outermost rod of the roof panel and includes at least one first base unit; at least one second base unit; a fastener; and a side panel. With the implementation of the present invention, the side panel can be raised and fixed securely to contain and protect small objects or luggage, or the side panel can be set flat on the roof panel and fixed securely to contain larger or wider objects. Together with the invention of the axis deviation between the rotation axis of the side panel and the axis of the first and second through holes, the side panel can be really set flat on or set vertically standing on the roof panel.

10 Claims, 7 Drawing Sheets

(56) References Cited

U.S. PATENT DOCUMENTS

2016/0114733 A1\* 4/2016 Pfaeffli .................... B60R 9/08
224/318

\* cited by examiner

COLLAPSIBLE SIDE PANEL STRUCTURE OF A ROOF PANEL

TECHNICAL FIELD

The present invention relates to a side panel structure, and more particularly, to a collapsible side panel structure of a roof panel.

DESCRIPTION OF RELATED ART

As cars are being in wide use nowadays in recreation or leisure life, consumers' demands for roof panels or roof top compartments are continuously increasing for carrying baggage, large cargos or small cargos. Side panels are then also in great use together with the roof panel for helping secure the objects on the roof panel.

However, every known side panels of existing roof panels in the market or being used are all fixed to the roof panels and cannot be moved, and result in the inconvenience when there is a need to put large objects on the roof panel, and the danger of breaking the containing objects, the height limitation bar, or even the building or the car body itself when entering into some certain car parking areas or a lower part of a road.

That results in the needs for an innovation and improvement by inventing a new roof panel with collapsible side panel structures, that not only can be applied to almost all kinds of cars and vehicles, with the creative invention of the collapsible side panel structure, objects of different size or shape to be contained can be firmly fixed and fastened on the roof panel by raising or setting flat the collapsible side panel structure complied with the requirement of the containing objects, and eventually, creating an improvement of convenience, reliability and safety in driving together with a great innovation and improvement in relating industry and knowledge.

SUMMARY OF THE INVENTION

The present invention discloses a collapsible side panel structure of a roof panel, set upon the outermost rod of the roof panel and includes at least one first base unit; at least one second base unit; a fastener; and a side panel. With the implementation of the present invention, the side panel can be raised and fixed securely to contain and protect small objects or luggage, or the side panel can be set flat on the roof panel and fixed securely to contain larger or wider objects. Together with the invention of the axis deviation between the rotation axis of the side panel and the axis of the first and second through holes, the side panel can be really set flat on or set vertically standing on the roof panel.

The present invention provides a collapsible side panel structure of a roof panel, set upon the outermost rod of the roof panel, and comprising: at least one first base unit, being made of sturdy material and set connected on said outermost rod, comprises a first through hole; at least one second base unit, being made of sturdy material and set corresponding to said first base unit, includes a second through hole, a concave edge and a combination part, wherein the second through hole and the first through hole share a same axis; a fastener, running through said first through hole and said second through hole and tightly combines said first base unit and said second base unit; and a side panel, being fixed connected to said combination part and rotating on the said fastener together with the combination part.

In an embodiment, said side panel being rotating on said axis together with the combination part of the second base unit.

In an embodiment, a rotation axis of said concave edge being deviated from said axis of said first and second through holes.

In an embodiment, the rotation axis of said concave edge being parallel to said axis of said first and second through holes.

In an embodiment, said fastener being a screw knob.

In an embodiment, said side panel being rotated to be vertical to the roof panel and fixed tightly by the fastener.

In an embodiment, said concave edge of said second base unit contacts the outermost rod of the roof panel.

In an embodiment, side panel being rotated to be parallel to and set on the roof panel and fixed tightly by the fastener.

In an embodiment, said side panel being screw fixed to, riveting fixed to, welding fixed to, or being one piece formed together with the combination part of the second base unit.

Implementation of the present invention at least involves the following inventive steps:

1. The side panel can be really set flat on or set vertically standing on the roof panel.
2. The side panel can be tightly fixed when either raised vertically or set flat on the roof panel to contain and protect objects.
3. With the creative invention of the axis deviation between the rotation axis of the side panel and the axis shared by the first through hole and second through hole, the side panel can be really set flat on or set truly vertical standing on the roof panel.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

DETAILED DESCRIPTION OF THE EMBODIMENTS OF THE INVENTION

Embodiments with illustrating graphs are provided hereafter for further understanding and recognizing of the realization of the present invention.

Figure 1:
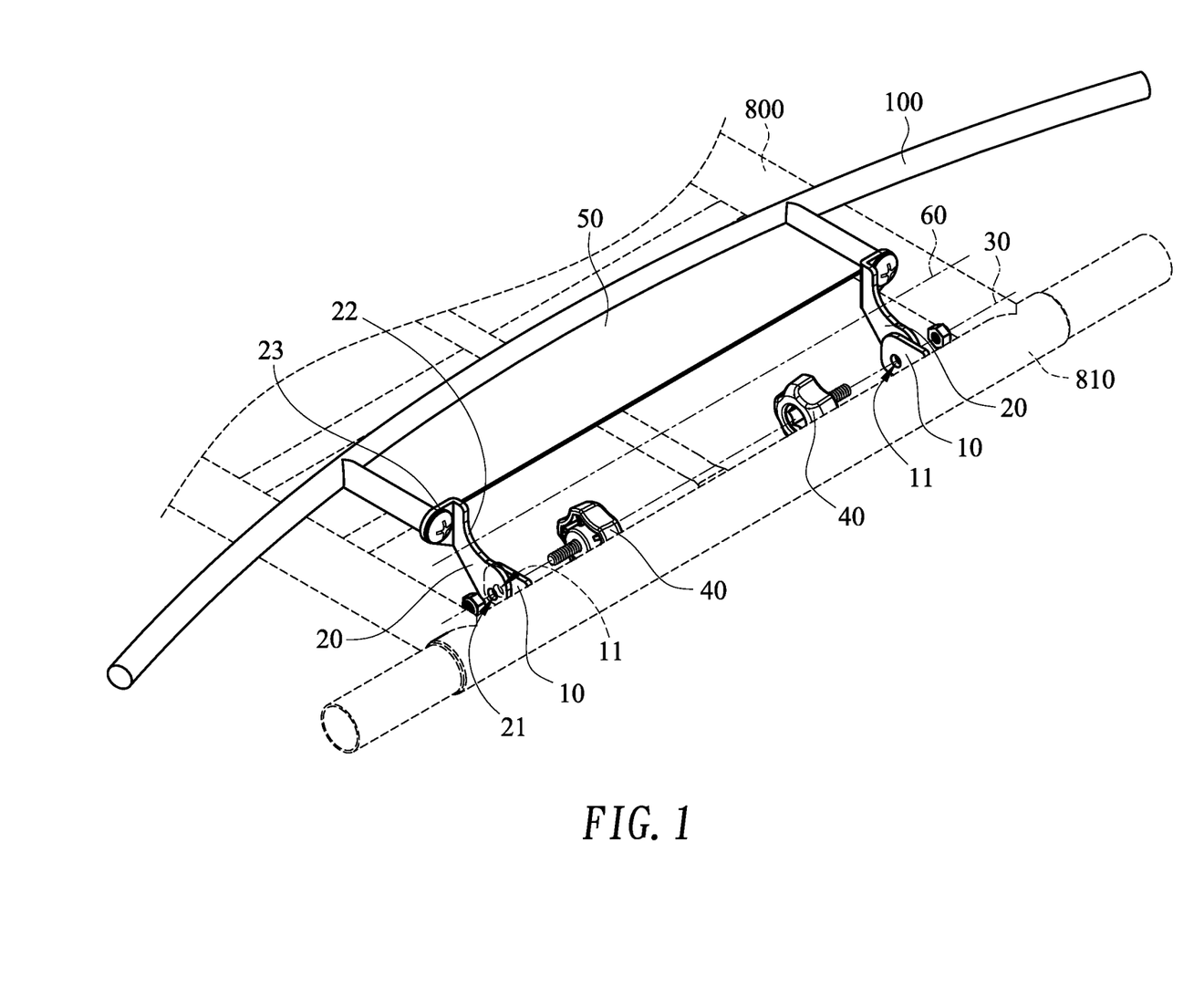
FIG. 1 is a schematic three-dimensional view of a collapsible side panel structure of a roof panel according to an embodiment of the present invention.

Please refer to FIG. 1, in an embodiment of the present invention, a collapsible side panel structure 100 of a roof panel 800, set upon the outermost rod 810 of the roof panel 800, and comprising: at least one first base unit 10; at least one second base unit 20; a fastener 40; and a side panel 50.

As shown in FIG. 1, when made of one kind of rigid or sturdy materials, the first base unit 10 being set connected on the outermost rod 810 of the roof panel 800, wherein a first through hole 11 is made on the first base unit 10.

The method for the first base unit 10 being set on the outermost rod 810 as seen in FIG. 1 can be its' being screw fixed, riveting fixed, or welding fixed to the outermost rod 810 of the roof panel 800.

As also shown in FIG. 1, the second base unit 20, also made of a rigid or sturdy material, being set corresponding to said first base unit 10, and includes a second through hole 21, a concave edge 22 and a combination part 23.

In the embodiment, said second through hole 21 of the second base unit 20, being set in a position corresponding to the first through hole 11, shares a same axis 30 with the first through hole 11 of the first base unit 10.

Please refer again to FIG. 1, the fastener 40, being running through both said first through hole 11 and said second through hole 21, tightly combines said first base unit 10 and said second base unit 20.

The fastener 40 as shown in FIG. 1 can be a screw knob that runs through both the first through hole 11 and the second through hole 21, and can either turn loose for rotating the second base unit 20 in relative to the first base unit 10 on, or tightened to make the second base unit 20 attach tightly to the first base unit 10 without sliding or rotating.

Figure 2:
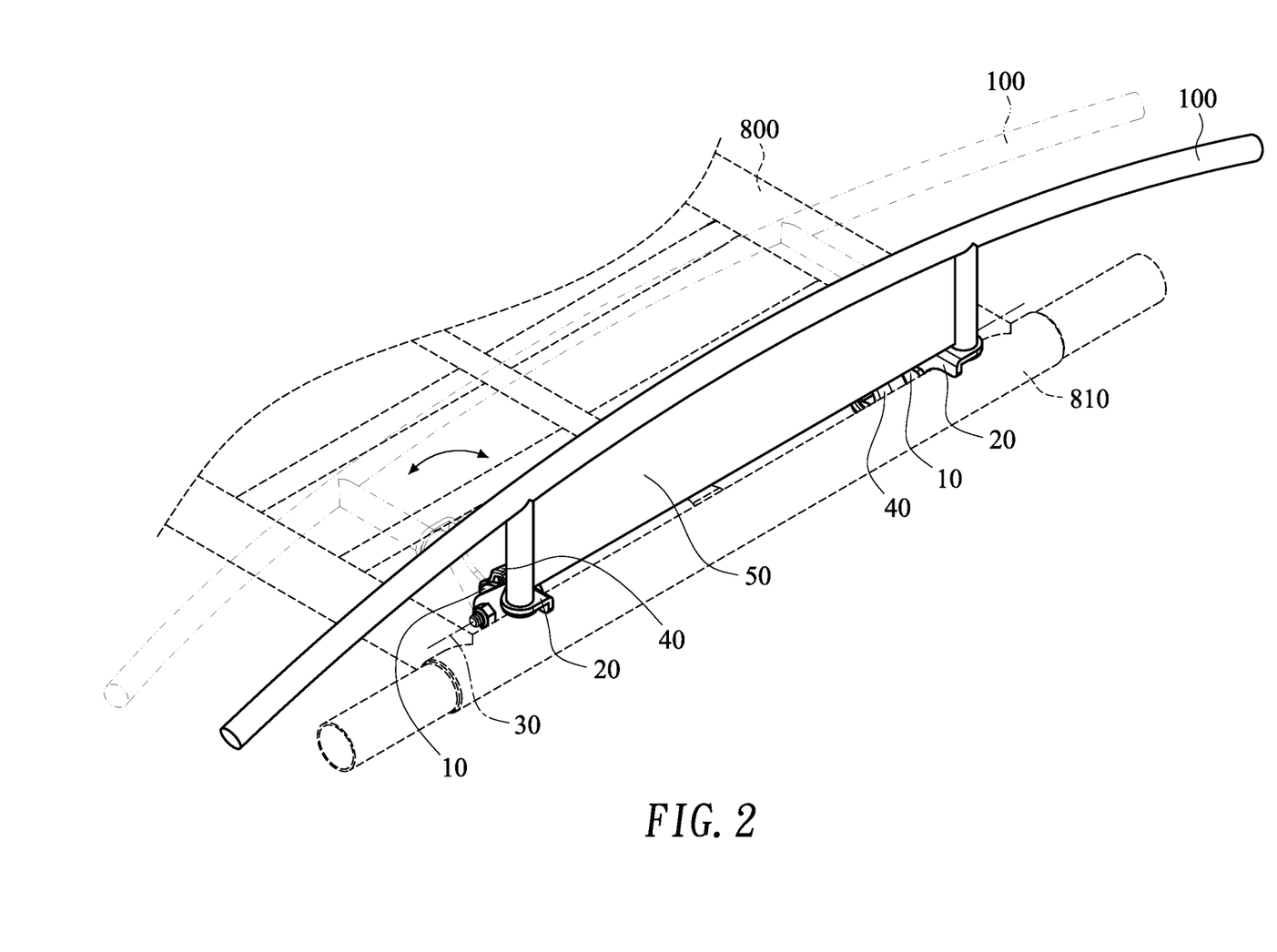
FIG. 2 is a schematic three-dimensional view of a collapsible side panel structure being rotating on the fastener according to an embodiment of the present invention.

Please refer then to FIG. 1 and FIG. 2, the side panel 50, which can be formed by bars, board, or bars and board, is formed fixedly connected to the combination part 23 of the second base unit 20 and can rotate on the fastener 40 together with the combination part 23 or be fixed tightly on the second base unit 20 and the first base unit 10 when the fastener 40 is tightened.

Wherein said side panel 50 can be screw fixed to, riveting fixed to, welding fixed to, or being one piece formed together with the combination part 23 of the second base unit 20.

Figure 3:
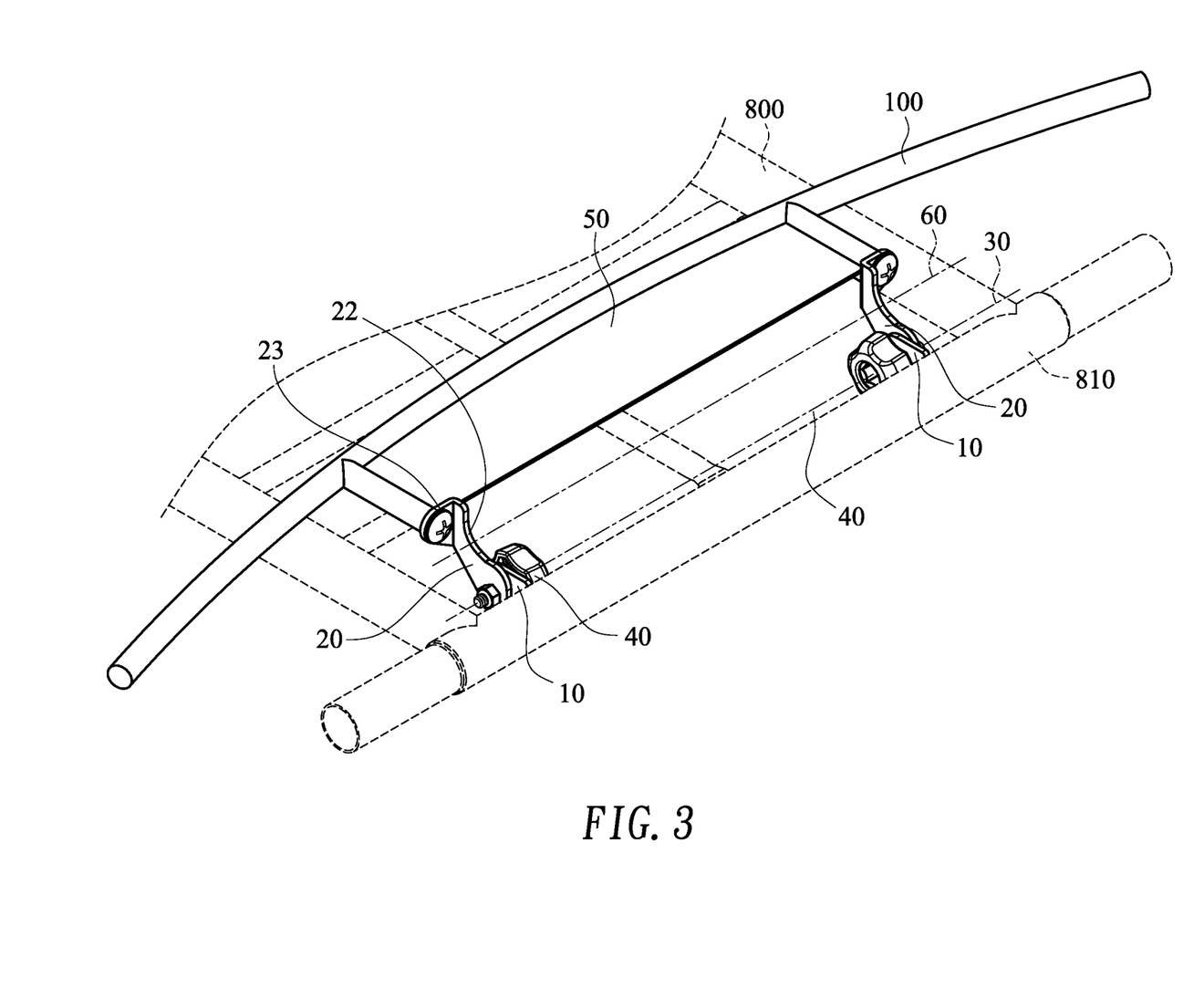
FIG. 3 is a schematic three-dimensional view of the rotation axis of the concave edge of the second base unit being deviated from the axis of the first and second through holes according to an embodiment of the present invention.

Please refer to FIG. 3, in an embodiment of the present invention, for the side panel 50 to be rotated to be truly vertical to the roof panel 800 and then fixed tightly by the fastener 40, the rotation axis 60 of the concave edge 22 of the second base unit 20 is formed deviated from the axis 30 shared by the first through hole 11 and the second through hole 21.

As can be seen in FIG. 3, the concave edge 22 of the second base unit 20 can be formed that the rotation axis 60 of the concave edge 22 is parallel to the axis 30 shared by the first through hole 11 and the second through hole 21.

Figure 4A:
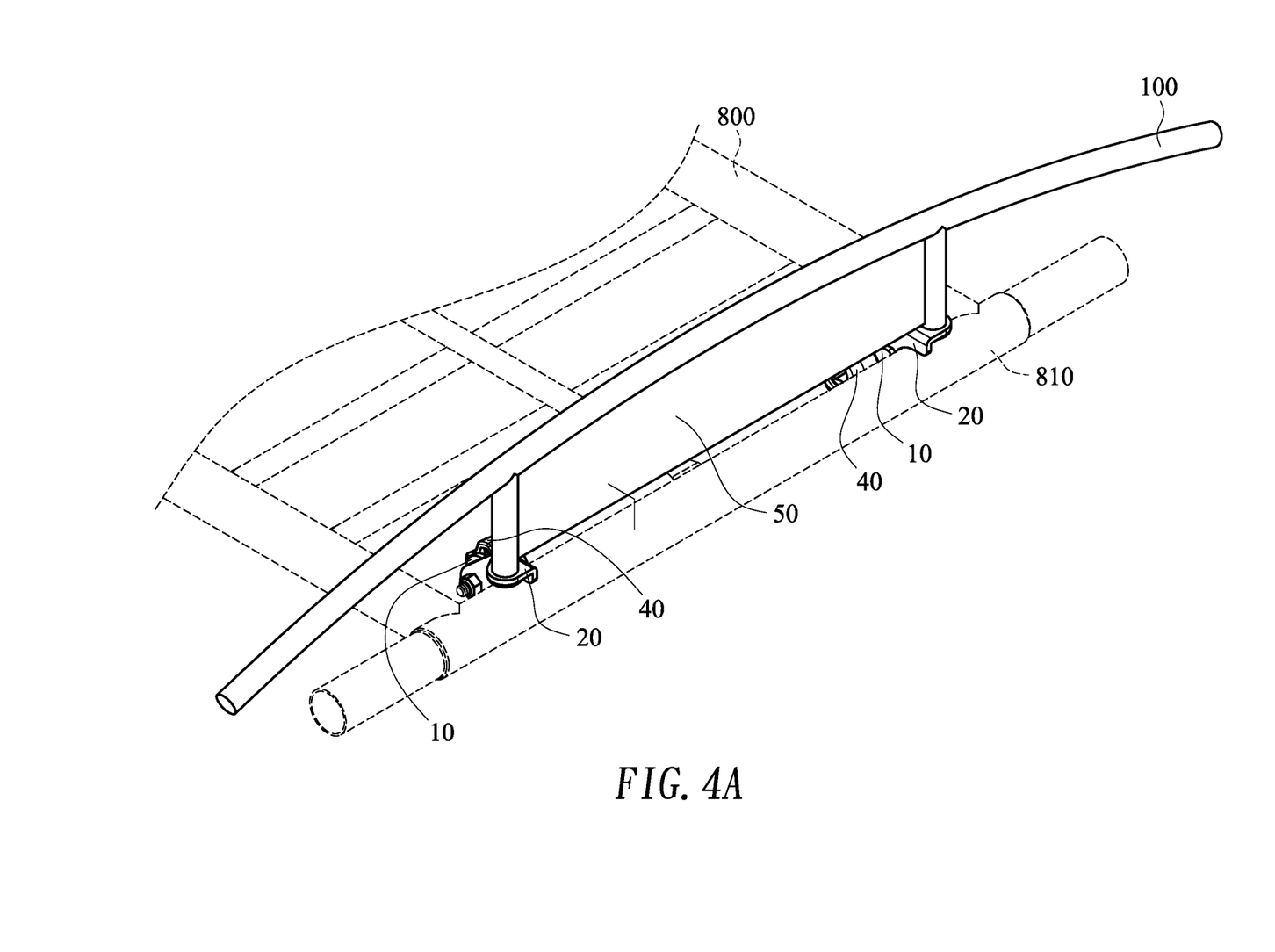
FIG. 4A is a schematic three-dimensional view of the side panel being rotated to be vertical to the roof panel and fixed tightly by the fastener according to an embodiment of the present invention.
Figure 4B:
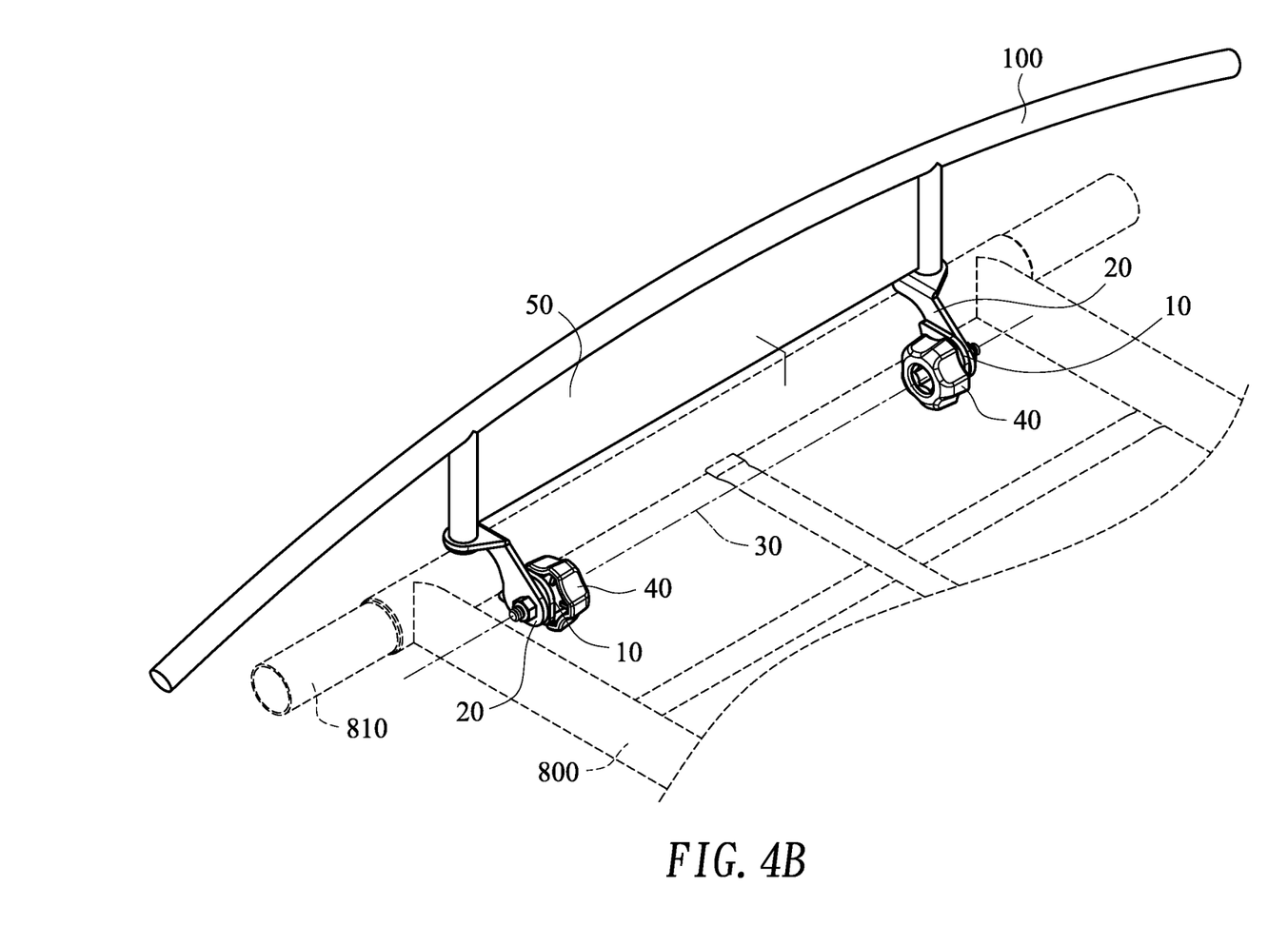
FIG. 4B is another schematic three-dimensional view of the side panel being rotated to be vertical to the roof panel and fixed tightly by the fastener according to an embodiment of the present invention.

As shown in FIG. 4A and FIG. 4B, the fastener 40 securely fastens tight the side panel 50 through the second base unit 20 when the side panel 50 is set vertical on the outermost rod 810 of the roof panel 800 for secure containing and protection of the cargo or objects on the roof panel 800.

Figure 5:
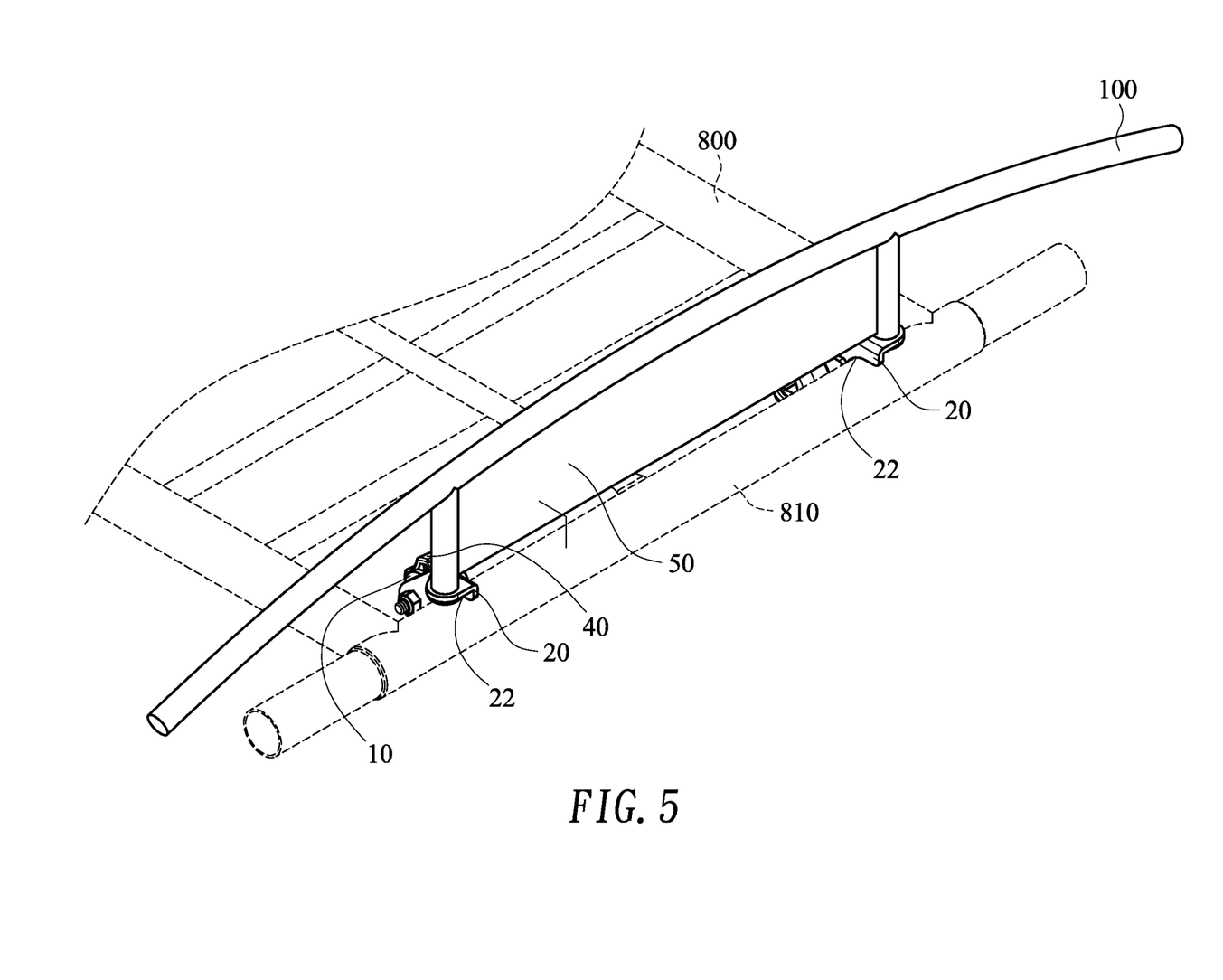
FIG. 5 is a schematic three-dimensional view of the concave edge of the second base unit contacts the outermost rod of the roof panel according to an embodiment of the present invention.

As shown in FIG. 5, at the time when the side panel 50 is set standing vertically on the outermost rod 810 of the roof panel 800, the concave edge 22 of the second base unit 20 actually contacts and rests on the outermost rod 810.

Figure 6:
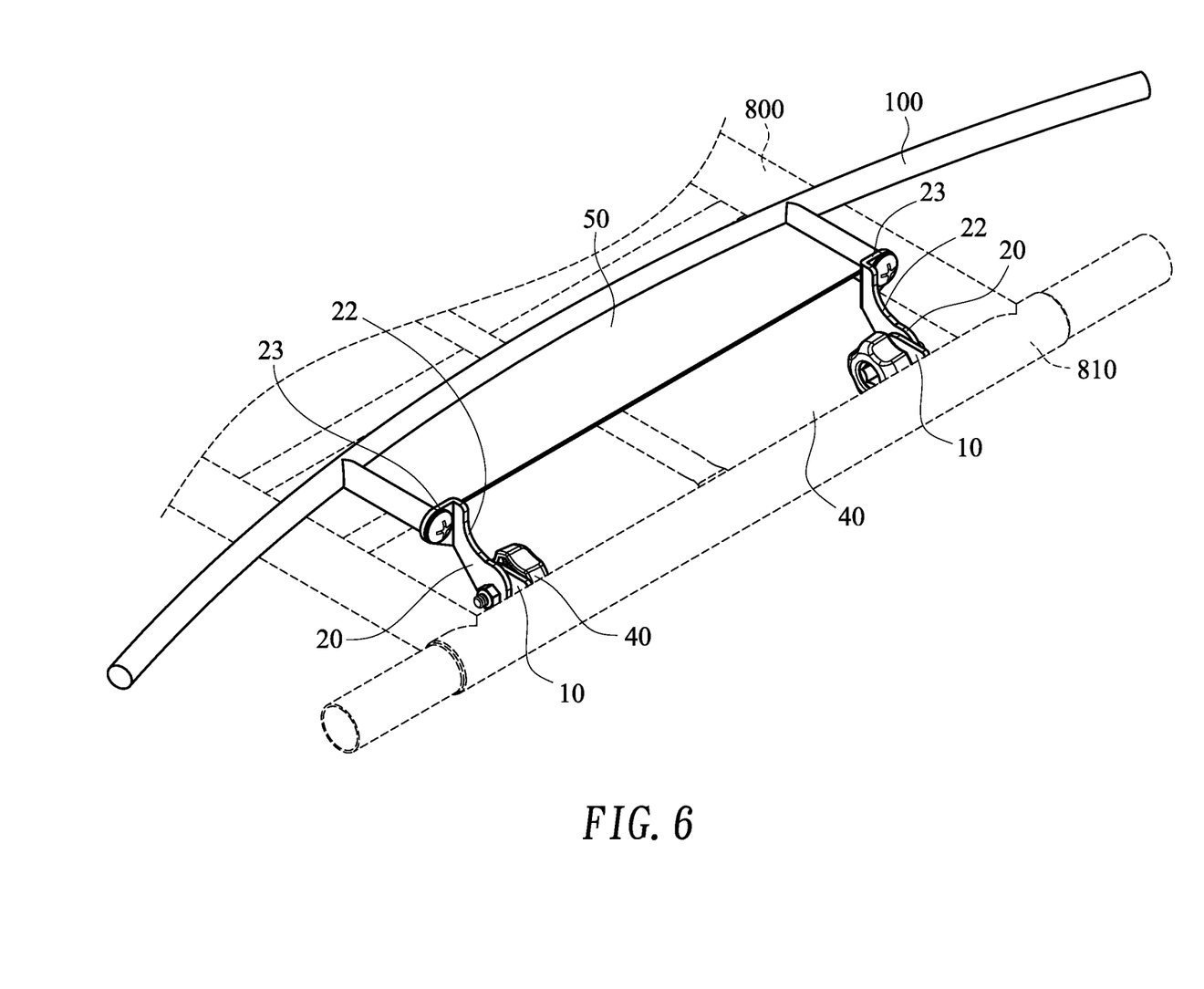
FIG. 6 is a schematic three-dimensional view of a collapsible side panel structure of a roof panel wherein the side panel being rotated to be parallel to and set on the roof panel and fixed tightly by the fastener according to an embodiment of the present invention.

And as shown in FIG. 6, in certain embodiments, the side panel 50 can also be rotated on the fastener 40 together with the second base unit 20 to set flat on and be parallel to the roof panel 800 and then securely fastened tight by the fastener 40.

In conclusion, multiple improvements as follows, which cannot be achieved by known existing solutions, can be achieved by vertically rising or setting flat the side panel 50 on the outermost rod 810 of the roof panel 800 in the present invention: Firstly, the side panel 50 can be really set flat on or set vertically standing on the roof panel 800 and tightly fastened by the fastener 40 to securely contain and protect objects. And secondly, with the creative invention of the axis deviation between the rotation axis 60 of the concave edge 22 of the second base unit 20 and the axis 30 shared by the first through hole 11 and the second through hole 21, the side panel 50 can be really set flat on or set truly vertical standing on the roof panel 800. While of course, the side panel 50 can exit in pair and set each on a outermost rod 810 on both sides of the roof panel 800 in embodiments and for actual containing and protection applications.

The embodiments described above are intended only to demonstrate the technical concept and features of the present invention to enable a person skilled in the art to understand and implement the contents disclosed herein. It is understood that the disclosed embodiments are not to limit the scope of the present invention. Therefore, all equivalent changes or modifications based on the concept of the present invention should be encompassed by the appended claims.

What is claimed is:

1. A collapsible side panel structure of a roof panel, set upon an outermost rod of the roof panel, and comprising:
   at least one first base unit, being set connected on said outermost rod, comprises a first through hole;
   at least one second base unit, being set by said first base unit, includes a second through hole, a concave edge and a combination part, wherein the second through hole and the first through hole share a same axis;
   a fastener, running through said first through hole and said second through hole and tightly combines said first base unit and said second base unit; and
   a side panel, being fixedly connected to said combination part and rotating on said fastener together with the combination part.

2. The collapsible side panel structure of a roof panel according to claim 1, wherein said side panel being rotating on said axis together with the combination part of the second base unit.

3. The collapsible side panel structure of a roof panel according to claim 1, wherein a rotation axis of said concave edge being deviated from said axis of said first and second through holes.

4. The collapsible side panel structure of a roof panel according to claim 3, wherein the rotation axis of said concave edge being parallel to said axis of said first and second through holes.

5. The collapsible side panel structure of a roof panel according to claim 1, wherein said fastener being a screw knob.

6. The collapsible side panel structure of a roof panel according to claim 1, wherein said side panel being rotated to be vertical to the roof panel and fixed by the fastener.

7. The collapsible side panel structure of a roof panel according to claim 6, wherein said concave edge of said second base unit contacts the outermost rod of the roof panel.

8. The collapsible side panel structure of a roof panel according to claim 1, wherein the side panel being rotated to be parallel to and set on the roof panel and fixed by the fastener.

9. The collapsible side panel structure of a roof panel according to claim 5, wherein the side panel being rotated to be parallel to and set on the roof panel and fixed by the fastener.

10. The collapsible side panel structure of a roof panel according to claim 1, wherein said side panel being screw fixed to, riveting fixed to, welding fixed to, or being one piece formed together with the combination part of the second base unit.

\* \* \* \* \*